US009479673B2

(12) United States Patent
Sasaki

(10) Patent No.: US 9,479,673 B2
(45) Date of Patent: Oct. 25, 2016

(54) IMAGE FORMING APPARATUS AND METHOD FOR CONTROLLING THE SAME

(71) Applicant: CANON KABUSHIKI KAISHA, Tokyo (JP)

(72) Inventor: Yuto Sasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/731,148

(22) Filed: Jun. 4, 2015

(65) Prior Publication Data

US 2015/0358499 A1 Dec. 10, 2015

(30) Foreign Application Priority Data

Jun. 6, 2014 (JP) ................................ 2014-118106

(51) Int. Cl.
*H04N 1/32* (2006.01)
*H04N 1/44* (2006.01)
*H04N 1/00* (2006.01)
*H04N 1/333* (2006.01)

(52) U.S. Cl.
CPC ...... *H04N 1/32122* (2013.01); *H04N 1/00244* (2013.01); *H04N 1/00326* (2013.01); *H04N 1/32689* (2013.01); *H04N 1/33361* (2013.01); *H04N 1/4413* (2013.01); *H04N 2201/0094* (2013.01); *H04N 2201/3226* (2013.01); *H04N 2201/3242* (2013.01)

(58) Field of Classification Search
USPC ....................................................... 358/1.15
See application file for complete search history.

(56) References Cited

U.S. PATENT DOCUMENTS

| 2007/0206212 | A1* | 9/2007 | Ohno | ..................... | G06F 3/1218 358/1.14 |
| 2009/0094198 | A1* | 4/2009 | Monga | ............... | G06F 17/30943 |
| 2009/0206212 | A1* | 8/2009 | Yen | ........................ | F16M 11/04 248/162.1 |
| 2010/0225957 | A1* | 9/2010 | Liu | ....................... | G06F 9/4411 358/1.15 |

FOREIGN PATENT DOCUMENTS

JP 2011-131382 A 7/2011

* cited by examiner

*Primary Examiner* — Ngon Nguyen
(74) *Attorney, Agent, or Firm* — Canon U.S.A. Inc., IP Division

(57) ABSTRACT

An image forming apparatus switches between a first processing and a second processing when processing document data. In the first processing, the document data is transmitted to a server without making a determination using a hash value of received document data and a hash value of data transmitted to the server. In the second processing, a determination is made using the hash value of the document data and the hash value of the transmitted data, and, based on a determination result, the document data is transmitted to the server.

15 Claims, 12 Drawing Sheets

FIG. 5A

| DOCUMENT ID | DOCUMENT HASH VALUE | USER ID | DATA SIZE |
|---|---|---|---|
| document1 | 1a7fk49anv | user1 | 35KB |
| document2 | fm184mz6f8 | user2 | 1.1MB |
| document3 | 936pqmzj4f | user3 | 503KB |
| document4 | afk037fak3 | user4 | 52KB |

FIG. 5B

| DOCUMENT ID | PARTIAL HASH VALUE | DOCUMENT HASH VALUE |
|---|---|---|
| document1 | alf94jf7zx | 1a7fk49anv |
| document2 | f94nclowpd | fm184mz6f8 |
| document3 | m0zr620asd | 936pqmzj4f |
| document4 | f8awpdn490 | afk037fak3 |

IMAGE FORMING APPARATUS AND METHOD FOR CONTROLLING THE SAME

BACKGROUND

1. Field

Aspects of the present invention generally relate to a technique for processing document data in an image forming system including at least one image forming apparatus and a server.

2. Description of the Related Art

With a conventional technique related to an image forming apparatus, in a case where processing required for printing or preview display cannot be performed in the image forming apparatus, printing or preview display is enabled through processing by using an external server (refer to Japanese Patent Application Laid-Open No. 2011-131382).

In a system using the technique discussed in Japanese Patent Application Laid-Open No. 2011-131382, there is a case where the image forming apparatus requests the server to process document data and, afterwards, requests again the server to process the same document data. In this case, since the image forming apparatus retransmits the same document data to the server, performance degradation due to communication occurs, resulting in overall performance degradation. In a method devised to prevent the performance degradation, the server stores document data, the image forming apparatus confirms, before transmitting the document data, whether the document data has once been transmitted to the server. If the document data has been once transmitted to the server, the apparatus does not retransmit the document data to the server. However, processing for confirming whether document data has been transmitted before to the server causes a load of confirmation processing, and the document data needs to be once spooled in the image forming apparatus. For this reason, performing confirmation processing on the entire document data before transmitting document data causes overall performance degradation.

SUMMARY

Aspects of the present invention are generally directed to providing a technique for reducing performance degradation when requesting a server to process data.

An image forming apparatus that communicates with a server for processing document data includes a receiving unit configured to receive document data, an acquisition unit configured to acquire a hash value of document data transmitted to the server, and a control unit configured to perform control by switching between a first processing and a second processing. In the first processing, the document data is transmitted to the server without making a determination using a hash value of the document data and the acquired hash value. In the second processing, a determination is made using the hash value of the document data and the acquired hash value, and, based on a determination result, the document data is transmitted to the server.

Further features of the present disclosure will become apparent from the following description of exemplary embodiments with reference to the attached drawings.

BRIEF DESCRIPTION OF THE DRAWINGS

FIGS. 5A and 5B are examples of tables managed by the image forming apparatus.

DESCRIPTION OF THE EMBODIMENTS

Exemplary embodiments will be described below with reference to the accompanying drawings. The following exemplary embodiments are illustrative and are not meant to be limiting.

Figure 1:
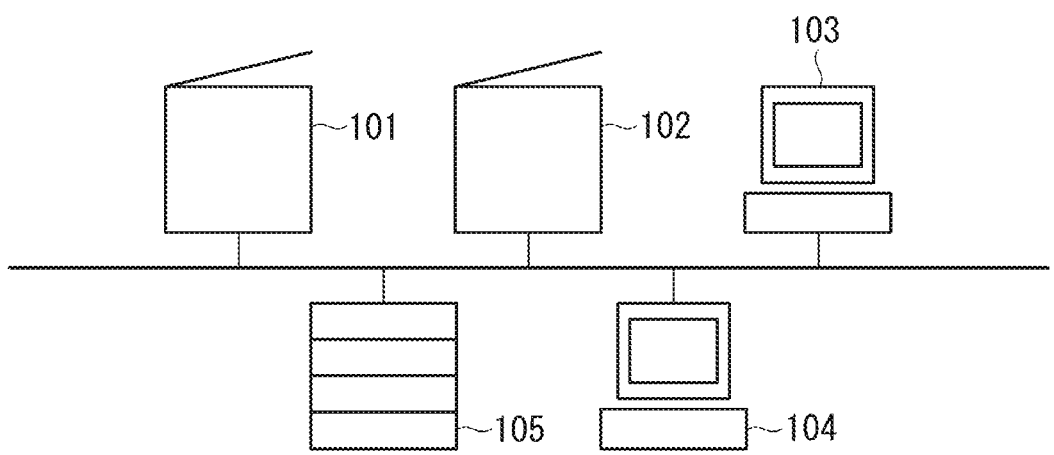
FIG. 1 illustrates a configuration of an image forming system.

A first exemplary embodiment will be described below. FIG. 1 illustrates an example of a configuration of an image forming system according to the present exemplary embodiment. The image forming system includes a plurality of image forming apparatuses including image forming apparatuses 101 and 102, information processing terminals 103 and 104, and a server 105, all of which are connected via a network and are able to communicate with each other. Descriptions about an image forming apparatus will be made only on the image forming apparatus 101. The above-described network refers to a local area network (LAN), the Internet, and any other communication methods for enabling apparatuses in the image forming system to communicate with each other.

The image forming apparatus 101 is capable of receiving an image data printing request from the information processing terminal, printing an image, reading an image by using a scanner provided on the apparatus, and printing the read image. The image forming apparatus 101 presents to a user the contents of a Server Message Block (SMB) shared folder in the information processing terminal and a Universal Serial Bus (USB) memory attached to the image forming apparatus 101. The image forming apparatus 101 is capable of printing document data selected from the SMB shared folder and the USB memory by the user. The image forming apparatus 101 is further capable of directly receiving document data from the information processing terminal via a network interface (I/F) 314. Although the Line PRinter daemon protocol (LPR) and the Internet Printing Protocol (IPP) may be employed as the above-described communication protocol, these are merely examples, and any other methods are applicable. The image forming apparatus 101 is further capable of requesting the server 105 to perform image processing which cannot be performed by the image forming apparatus 101 by itself.

Figure 2A:
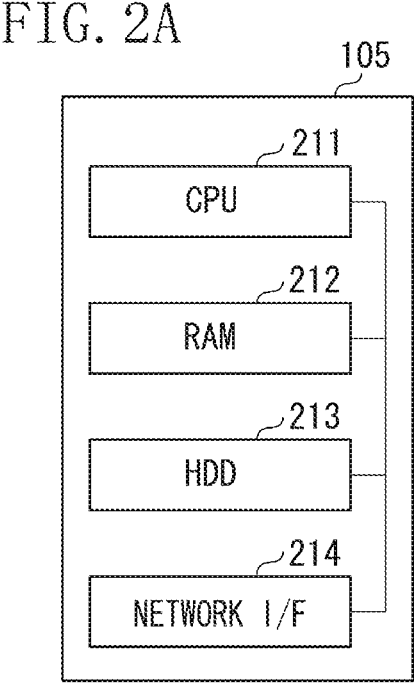
FIGS. 2A and 2B illustrate configurations of a server and an image forming apparatus, respectively.

FIG. 2A illustrates an example of a configuration of the server 105.

The server 105 includes a central processing unit (CPU) 211, a random access memory (RAM) 212, a hard disk drive (HDD) 213, and a network I/F 214. The CPU 211 manages control of the entire apparatus and is able to control data transmission and reception to/from the RAM 212, the HDD 213, and the network I/F 214. Further, the CPU 211 loads a control program (instructions) read from the HDD 213 into the RAM 212 and executes the instructions stored in the RAM 212.

The HDD 213 stores control programs (instructions) for implementing image processing, which are executable by the CPU 211. The above-described image processing in the present specification refers to generating print data and preview data based on input document data in various file formats. However, the image processing may be any other image processing. The HDD 213 is further able to suitably store information about file formats which can be processed by the server 105 and received conversion processing content and document data.

The RAM 212 is able to store various types of data required for execution of instructions. The CPU 211 is able to load instructions and data stored in the HDD 213 into the RAM 212 and read them from the RAM 212. The network I/F 214 performs network communication with apparatuses in the image forming system, and is able to notify the CPU 211 of data reception and transmit data on the RAM 212 to the network.

Figure 2B:
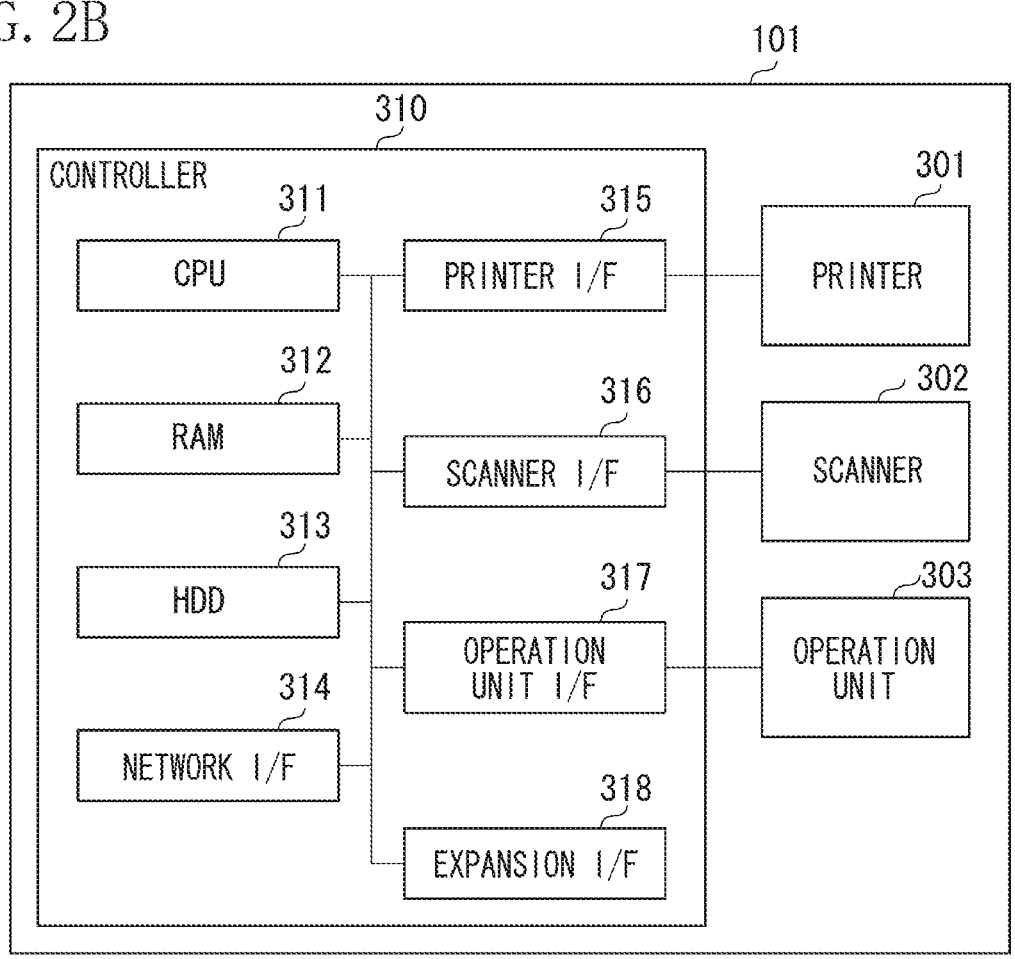

FIG. 2B illustrates an example of a configuration of the image forming apparatus 101.

The image forming apparatus 101 includes a controller 310, a printer 301, a scanner 302, and an operation unit 303. The controller 310 includes a CPU 311, a RAM 312, a HDD 313, a network I/F 314, a printer I/F 315, a scanner I/F 316, an operation unit I/F 317, and an expansion I/F 318. The CPU 311 is able to transmit and receive data to/from the RAM 312, the HDD 313, the network I/F 314, the printer I/F 315, the scanner I/F 316, and the operation unit I/F 317. Further, the CPU 311 loads instructions read from the HDD 313 into the RAM 312 and executes the instructions stored in the RAM 312.

The HDD 313 is able to store instructions executable by the CPU 311, setting values to be used by the apparatuses, and data related to processing requested by the user.

The RAM 312 is able to store various types of data required for execution of instructions. The CPU 311 is able to load instructions and data stored in the HDD 313 into the RAM 312 and read them from the RAM 312.

The network I/F 314 performs network communication with apparatuses in the image forming system, and is able to notify the CPU 311 of data reception and transmit data on the RAM 312 to the network.

The printer I/F 315 is able to transmit to the printer 301 print data transmitted from the CPU 311 and notify the CPU 311 of a printer status received from the printer 301. The scanner I/F 316 is able to transmit to the scanner 302 an image reading instruction transmitted from the CPU 311, notify the CPU 311 of image data received from the scanner 302, and notify the CPU 311 of a status received from the scanner 302. The operation unit I/F 317 is able to notify the CPU 311 of a user instruction input from the operation unit 303 and notify the operation unit 303 of screen information for user operations.

The printer 301 is able to print image data received from the printer I/F 315 on paper and notify the printer I/F 315 of a printer status. The scanner 302 is able to read a document sheet placed on the scanner 302 according to an image reading instruction received from the scanner I/F 316, generate digital data based on the read image, transmit the generated digital data to the scanner I/F 316, and notify the scanner I/F 316 of a scanner status. The operation unit 303 enables the user to operate the image forming apparatus 101. The operation unit 303 is provided with, for example, a liquid crystal display having a touch panel which provides the user with operation screens and receives operations from the user.

The expansion I/F 318 is able to connect an external apparatus to the image forming apparatus 101. For example, the expansion I/F 318 is provided with an interface having the USB format. For example, when an external storage such as a USB memory is connected to the expansion I/F 318, it enables writing and reading data to/from the external storage.

Figure 3A:
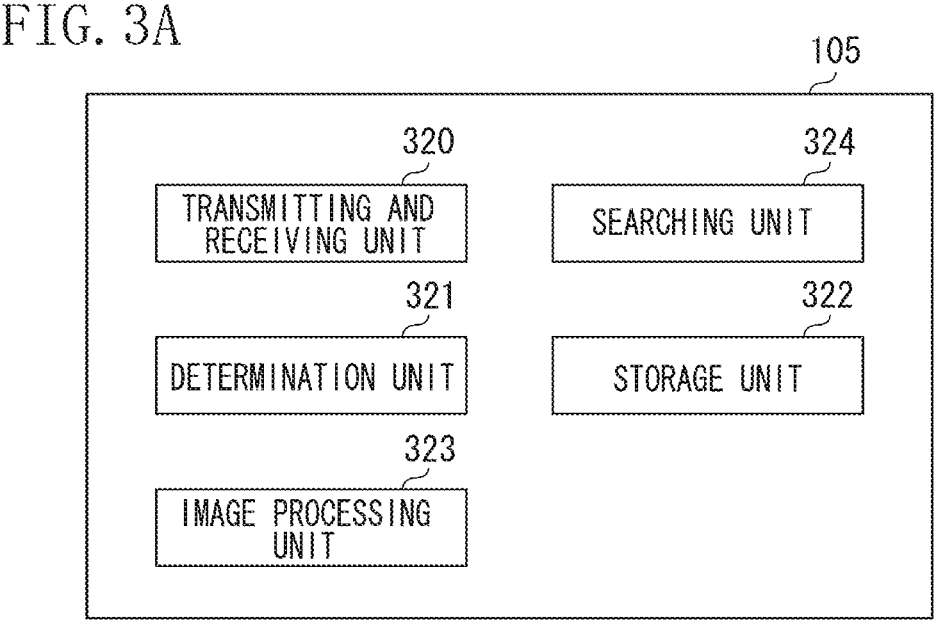
FIGS. 3A and 3B are functional block diagrams of the server and the image forming apparatus, respectively.

FIG. 3A is a functional block diagram illustrating the server 105. The transmitting and receiving unit 320 transmits and receives data to/from an external apparatus such as the image forming apparatus 101. The determination unit 321 determines whether received data is a document identifier (ID) or document data, and performs various other determinations. The storage unit 322 stores document data and a document ID. The image processing unit 323 performs image processing on document data. The search unit 324 searches for corresponding document data by using a document ID.

Figure 3B:
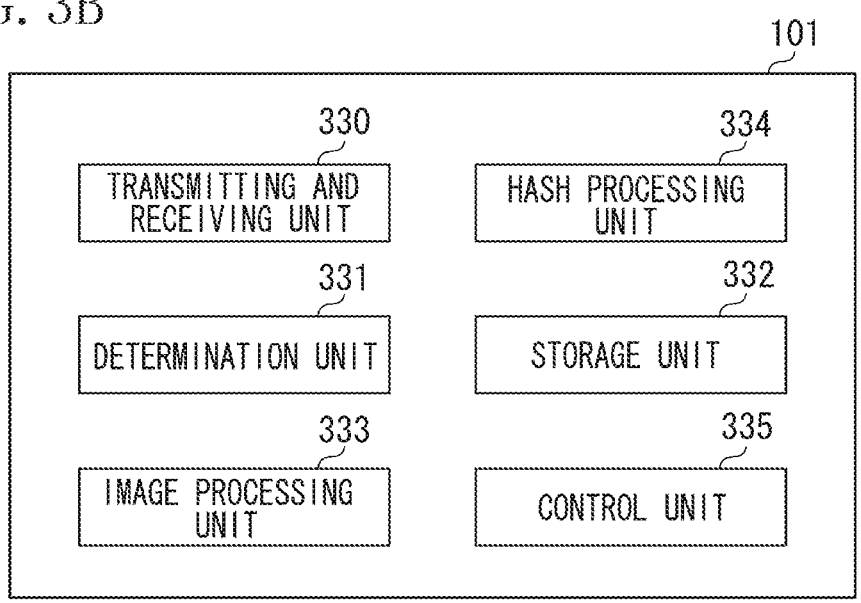

FIG. 3B is a functional block diagram illustrating the image forming apparatus 101. The transmitting and receiving unit 330 transmits and receives data to/from an external apparatus such as the server 105. The determination unit 331 determines whether target image processing is executable by the image forming apparatus 101 and performs various other determinations. The storage unit 332 stores document data and tables (described below). The image processing unit 333 performs image processing on document data. The hash processing unit 334 performs hash processing on document data. The control unit 335 executes a job and switches between first processing and second processing (described below) on data processed by the image processing unit 333.

Figure 4:
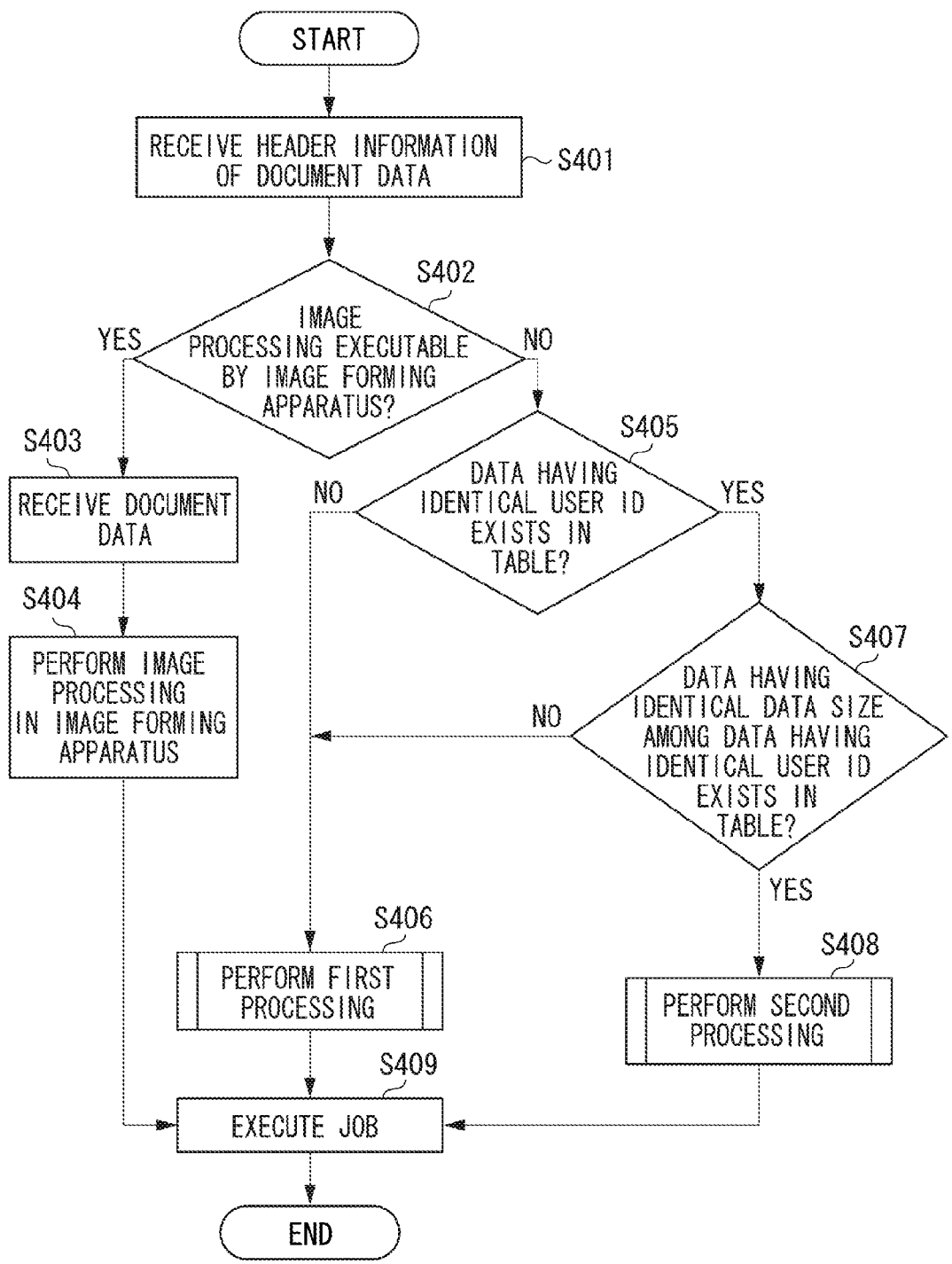
FIG. 4 is a flowchart illustrating processing by an image forming apparatus according to a first exemplary embodiment.

FIG. 4 is a flowchart illustrating operations performed by the image forming apparatus 101 according to the present exemplary embodiment. More specifically, this flowchart illustrates sequence switching by using a user ID and a data size.

In step S401, the transmitting and receiving unit 330 receives header information of document data. More specifically, the transmitting and receiving unit 330 receives packets of document data stored in the HDD 213 of the image forming apparatus 101, a USB memory attached to the image forming apparatus 101, and a SMB shared folder in an information processing terminal. The transmitting and receiving unit 330 also receives document data packets from an external terminal via the network I/F 214 of the image forming apparatus 101. In addition to the above-described methods for receiving document data, any other methods are applicable. The header information of the document data received in step S401 includes details of processing to be performed on the document data, a user ID, and a data size of the document data.

In step S402, the determination unit 331 determines whether the processing is executable by the image processing unit 333 of the image forming apparatus 101. More specifically, the determination unit 331 determines whether the processing to be performed on the document data, which is included in the header information received in step S401, is executable by the image forming apparatus 101. The processing refers to, for example, preview image data generation, thumbnail image data generation, print data generation, document data format conversion, etc. which correspond to processing required for job execution in step S404. When processing by the controller 310 of the image forming apparatus 101 is possible (YES in step S402), then in step S403, the transmitting and receiving unit 330 receives the remaining document data of the document data received in step S401. In step S404, the image processing unit 333 performs image processing. In step S409, the control unit 335 executes a job. More specifically, job execution refers to printing, previewing, FAX transmission, data transmission, and so on.

When the image processing is not executable by the image processing unit 333 of the image forming apparatus 101 (NO in step S402), then in step S405, the determination unit 331 determines whether data having an identical user ID exists in a table 501. More specifically, the determination unit 331 determines whether data having an identical user ID to the user ID included in the header information, which is received in step S401, exists in the table 501.

The table 501 will be described below. FIG. 5A illustrates an example of a table managed by the image forming apparatus 101 according to the present exemplary embodiment. The table 501 indicates document data that is transmitted to the server 105. Since the server 105 stores document data transmitted from the image forming apparatus 101, use of the table 501 enables confirming whether the relevant document data is stored in the server 105. The table 501 includes a document ID 502, a document hash value 503, a user ID 504, and a data size 505. The document ID 502 identifies each piece of document data stored in the server 105. The document ID 502 may be anything as long as it can be used to identify each piece of document data. For example, a unique ID for accessing document data such as a uniform resource locator (URL) is also applicable. The document hash value 503 is the hash value for document data. The user ID 504 is the ID of a user who transmits document data to the server 105. The data size 505 is the data size of document data.

When data having an identical user ID does not exist in the table 501 (NO in step S405), i.e., target document data does not exist in the server 105, then in step S406, the control unit 335 performs first processing. In step S409, the control unit 335 executes a job. The first processing (step S406) refers to processing for transmitting document data to the server 105 without performing determination by using the document data and the hash value. The first processing will be described in detail below with reference to FIG. 6.

In step S407, when data having an identical user ID exists in the table 501, the determination unit 331 determines whether data having an identical document data size exists among the data having an identical user ID in the table 501.

When data having an identical document data size does not exist (NO in step S407), then in step S406, the control unit 335 performs the first processing. In step S409, the control unit 335 executes a job. When data having an identical document data size exists (YES in step S407), then in step S408, the control unit 335 performs the second processing. In step S409, the control unit 335 executes a job. The second processing (step S408) refers to performing determination by using the document data and the hash value, and transmitting the document data to the server 105 based on a determination result. The second processing will be described in detail below with reference to FIG. 7.

Figure 6:
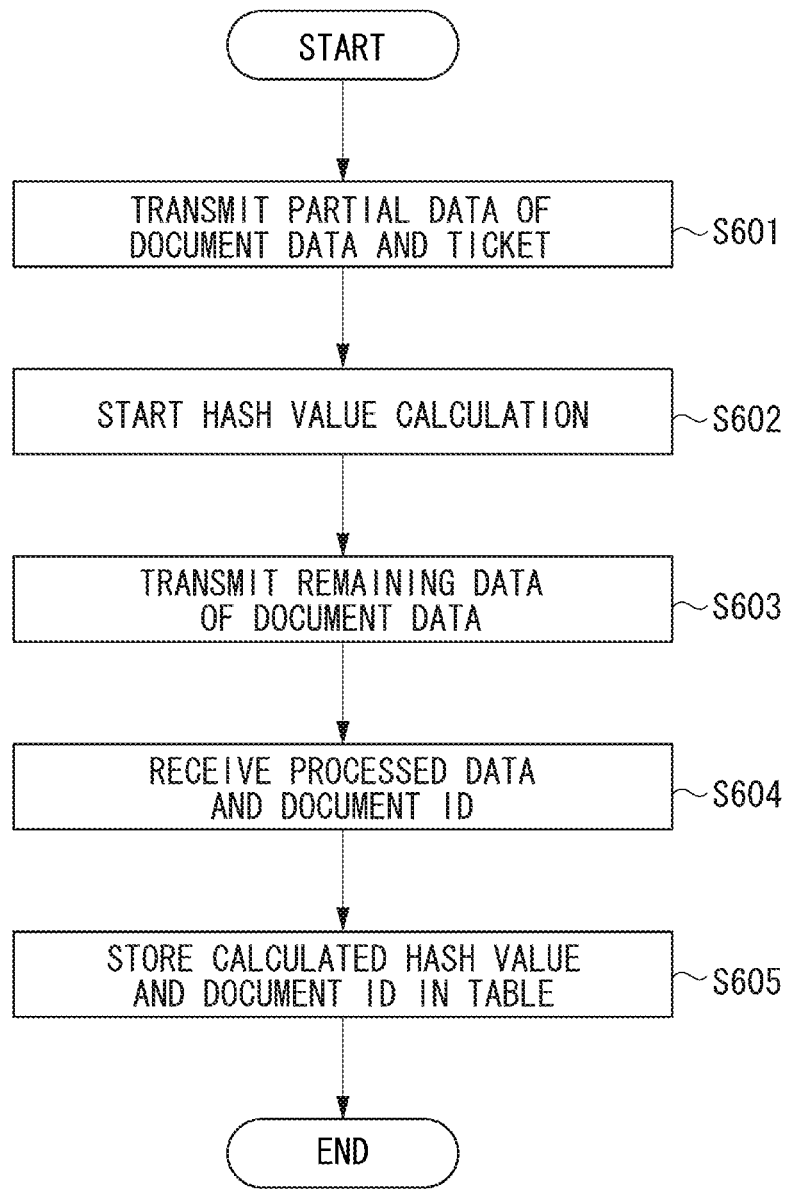
FIG. 6 is a sub flowchart illustrating processing in step S406 illustrated in FIG. 4.

FIG. 6 is a sub-flowchart illustrating processing in step S406 illustrated in FIG. 4.

In step S601, the transmitting and receiving unit 330 of the image forming apparatus 101 transmits partial data of the received document data and a ticket to the server 105. The ticket describes details of image conversion processing in a format interpretable by the server 105, for example, in the Extensible Markup Language (XML). However, any other methods are applicable to the ticket as long as the server 105 is able to interpret the contents of conversion and perform image processing. In step S601, the transmitting and receiving unit 330 may perform chunk transmission for each of received block without once spooling the document data in the HDD 313 of the image forming apparatus 101.

In step S602, the hash processing unit 334 starts the hash value calculation by using partial data of the document data. The hash value calculation is performed in such a way that the hash processing unit 334 performs processing based on first partial data, performs processing based on a result of the previous processing and second partial data, and performs processing based on a result of the previous processing and third partial data. More specifically, the hash value calculation can be started without storing all of the document data. The image forming apparatus 101 is able to start the hash value calculation without waiting for all of the document data to be received.

In step S603, the transmitting and receiving unit 330 transmits the remaining data of the document data to the server 105.

In step S604, the transmitting and receiving unit 330 receives from the server 105 data processed by the server 105 and the document ID 502. In step S605, the storage unit 332 stores the calculated hash value (the document hash value 503) and the document ID 502 in the table 501. FIG. 5A illustrates the document ID 502, the document hash value 503, the user ID 504, and the data size 505 of the document data. The document hash value 503 is a hash value for document data input to the server 105. The image forming apparatus 101 is able to determine whether the document data exists in the server 105 through comparison of the hash values.

The order of execution of steps S601, S602, and S603 is not limited to the order illustrated in FIG. 6 as long as the image forming apparatus 101 starts the document data transmission to the server 105 before receiving all of the document data. As a result of advancing the timing of starting the document data transmission to the server 105, reception of the processed data can also be advanced. As for the timing of starting the hash value calculation, the hash processing unit 334 may start the hash value calculation after all of the document data is transmitted to the server 105. However, because of the mechanism of the hash value calculation, the hash processing unit 334 is able to start the hash value calculation before all of the document data is received.

Figure 7:
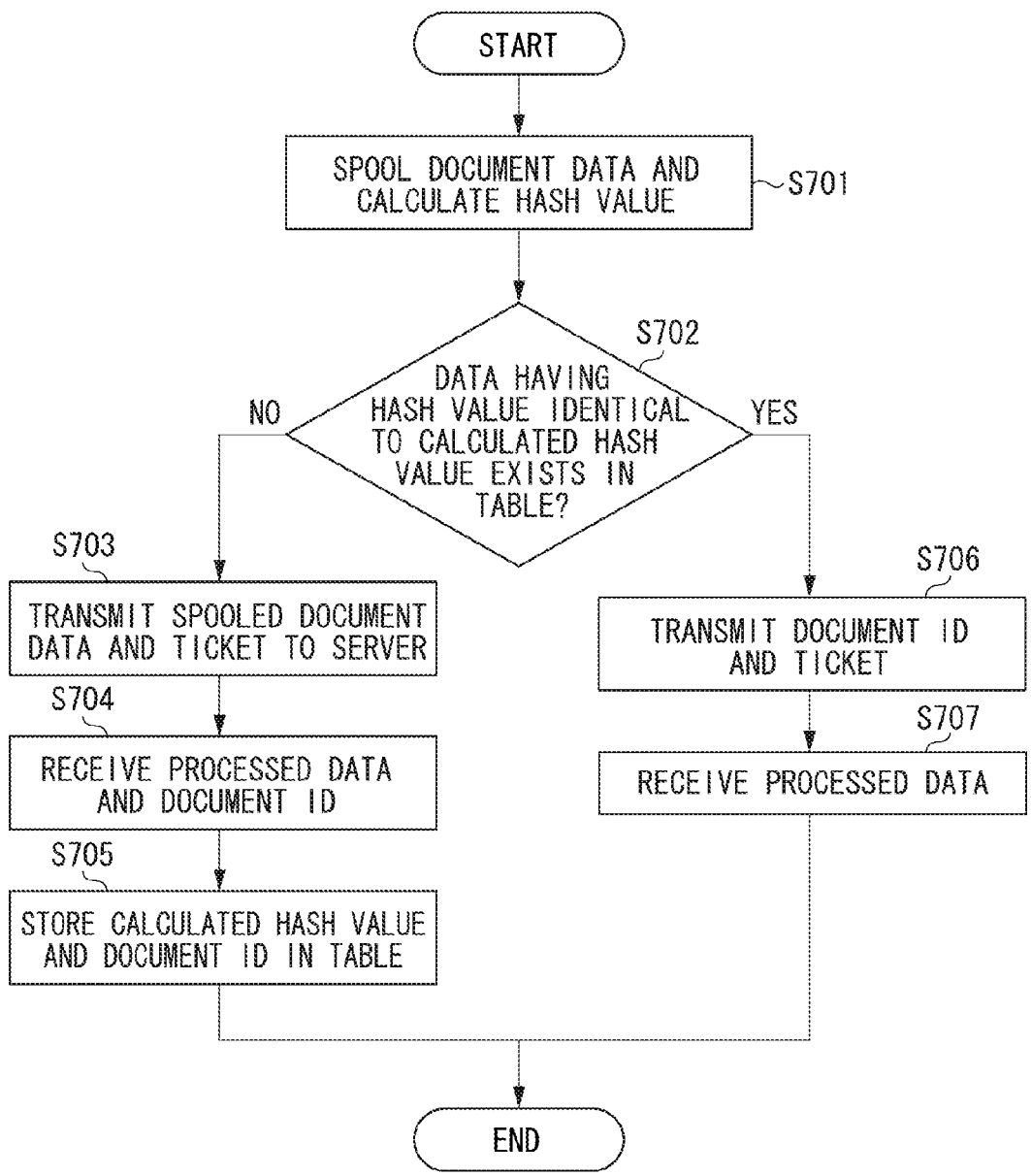
FIG. 7 is a sub flowchart illustrating processing in step S408 illustrated in FIG. 4.

FIG. 7 is a sub-flowchart illustrating the processing in step S408 illustrated in FIG. 4.

In step S701, the hash processing unit 334 spools target document data and then performs the hash value calculation. In step S702, the hash processing unit 334 determines whether data having a hash value which matches the calculated hash value with respect to the target document data exists in the document hash values 503 in the table 501. When the hash processing unit 334 determines that data having a hash value which matches the calculated hash value does not exist in the table 501 (NO in step S702), the processing proceeds to step S703. In step S703, the transmitting and receiving unit 330 transmits the spooled document data and a ticket to the server 105. In this case, the transmitting and receiving unit 330 does not perform chunk transmission since the document data to be transmitted is spooled in the storage unit 332 (the HDD 313) of the image forming apparatus 101. In step S704, the transmitting and receiving unit 330 receives from the server 105 data processed by the server 105 and the document ID 502. In step S705, the storage unit 332 sets the document ID in the table 501 together with related attribute values. The above-described related attribute values refer to the document hash value 503 calculated in step S701, the user ID 504, and the data size 505 of the document data.

When the hash processing unit 334 determines that data having a hash value which matches the calculated hash value exists in the table 501 (YES in step S702), i.e., the target document data is determined to exist in the server 105, the processing proceeds to the step S706. In step S706, the transmitting and receiving unit 330 transmits to the server 105 the document data and the document ID 502 before accessing the document data stored in the server 105. For the document ID 502, any methods such as a unique Uniform Resource Identifier (URI) for the document data are applicable as long as the document data stored in the server 105 can be accessed.

Figure 9:
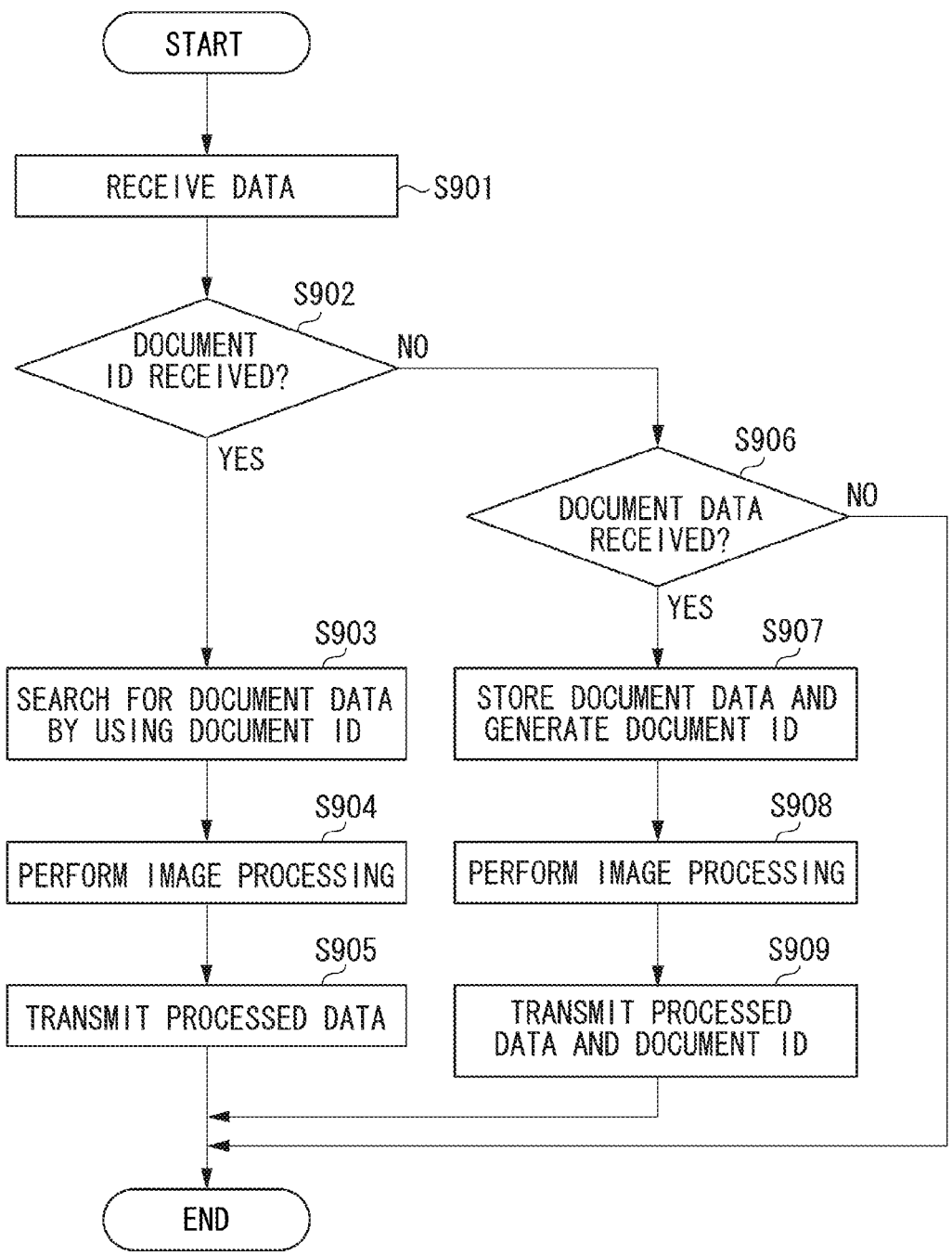
FIG. 9 is a flowchart illustrating processing by a server.

FIG. 9 is a flowchart illustrating processing by the server 105 according to the present exemplary embodiment.

In step S901, the transmitting and receiving unit 320 receives data from the image forming apparatus 101. When the image forming apparatus 101 performs the first processing, the transmitting and receiving unit 320 receives the document data and the ticket. On the other hand, when the image forming apparatus 101 performs the second processing, the transmitting and receiving unit 320 receives the document ID and the ticket. In step S902, the determination unit 321 determines whether the document ID is included in the received data, i.e., whether the document ID has been received. When the determination unit 321 determines that the document ID has been received (YES in step S902), the processing proceeds to step S903. On the other hand, when the determination unit 321 determines that the document ID has not been received (NO in step S902), the processing proceeds to step S906. In step S903, when the document ID is determined to have been received, the search unit 324 searches for document data by using the document ID. In step S904, the image processing unit 323 analyzes the contents of the received ticket and performs image processing on the searched document data. In step S905, the transmitting and receiving unit 320 transmits the converted document data to the image forming apparatus 101.

In step S906, the determination unit 321 determines whether document data has been received. When document data is determined to have been received (YES in step S906), the processing proceeds to step S907. On the other hand, when document data is determined to have not been received (NO in step S906), the processing exits this flowchart. When document data is determined to have been received (YES in step S906), then in step S907, the image processing unit 323 stores the document data in the storage unit 322 (the HDD 213) and generates the document ID 502. In step S908, the image processing unit 323 analyzes the contents of the received ticket and performs image processing on the document data. In step S909, the transmitting and receiving unit 320 transmits the processed data and the document ID 502 to the image forming apparatus 101.

In the present exemplary embodiment, in step S702, the hash processing unit 334 performs the hash value comparison by using the table 501 to determine whether the target document data exists in the server 105. However, use of hash values as a comparison method is only an example, and any other methods are applicable. For example, actually, the hash processing unit 334 is able to perform the determination in step S702 by spooling in the HDD 313 of the image forming apparatus 101 the document data that has been transmitted to the server 105 and performing document data comparison on a binary basis by using the spooled document data.

In the above-described processing in present exemplary embodiment, the determination unit 331 performs the determination in step S405 by using the user ID, which is included in the header information of the document data received in step S401. However, instead of using the user ID included in the header information, the user may be prompted to input a user ID through a user ID input unit of the image forming apparatus 101 and the determination unit 331 may use the input user ID when performing the determination in step S405.

A second exemplary embodiment will be described below. As the second exemplary embodiment, the following describes an example of switching between the first and the second processing by using the hash value of partial data of document data. Only portions different from the first exemplary embodiment will be described below.

FIG. 5B illustrates an example of a table 506 managed by the image forming apparatus 101 according to the present exemplary embodiment. The table 506 includes a document ID 507, a partial hash value 508, and a document hash value 509. The document ID 507 is used to identify each piece of document data stored in the server 105. Since the document ID 507 is used to identify each piece of document data, for example, a unique ID for accessing document data such as a uniform resource locator (URL) is also applicable. The partial hash value 508 is a value of partial data of document data. More specifically, the partial hash value 508 is the value of a header portion of the document data, i.e., a hash value for predetermined data. The document hash value 509 is a value for the document data.

Figure 8:
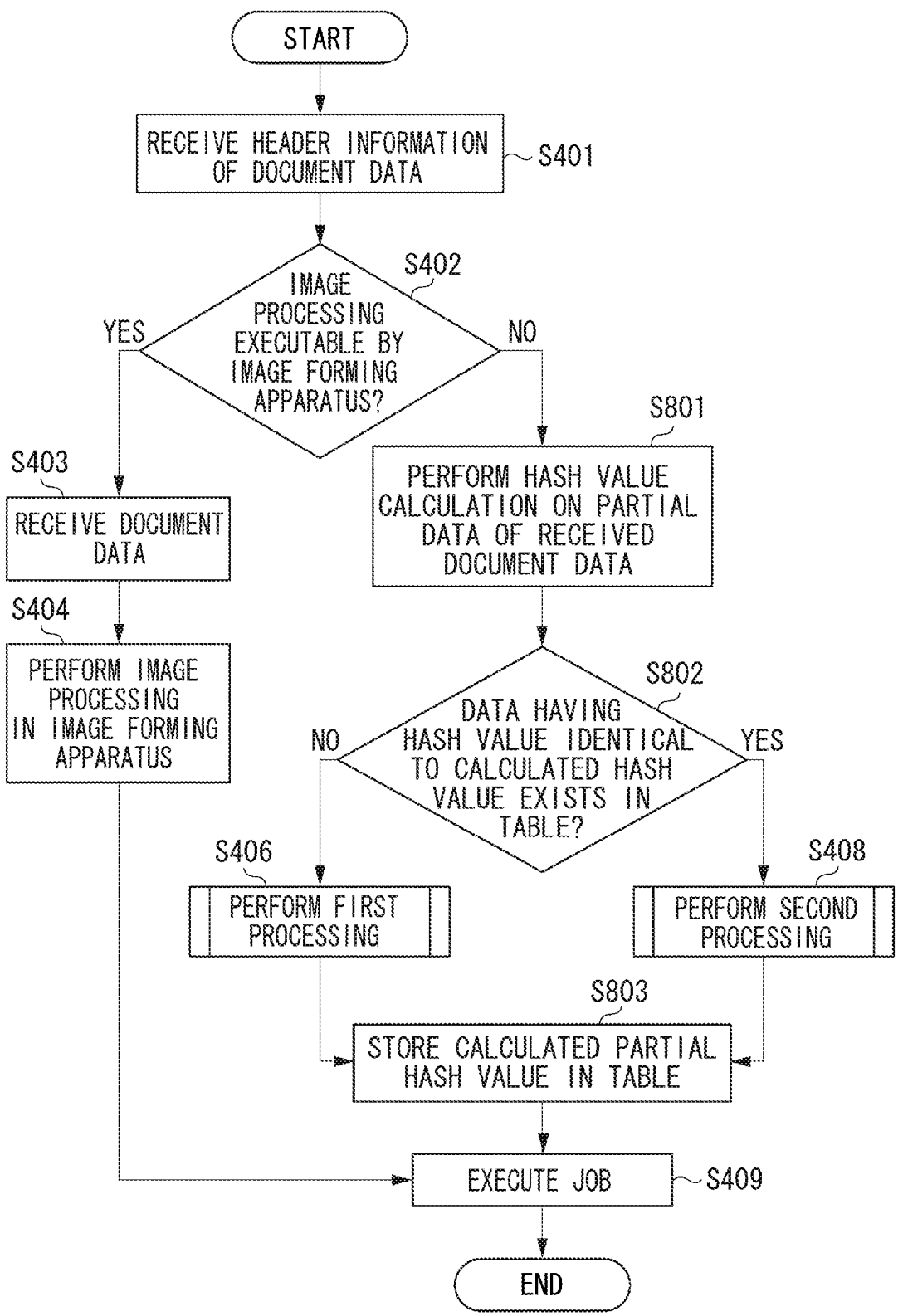
FIG. 8 is a flowchart illustrating processing by an image forming apparatus according to a second exemplary embodiment.

FIG. 8 is a flowchart illustrating processing performed by the image forming apparatus 101 according to the present exemplary embodiment. This flowchart is implemented when the CPU 311 of the image forming apparatus 101 executes a program stored in the HDD 313. Steps other than steps S801, S802, and S803 are similar to those in the first exemplary embodiment, and redundant descriptions thereof will be omitted.

In step S801, the hash processing unit 334 performs hash value calculation on the partial data of the received document data to acquire the partial hash value. In step S802, the determination unit 331 determines whether data having a hash value which matches the hash value calculated in step S801 exists in the table 506. When it is determined that such data exists in the table 506 (YES in step S802), the processing proceeds to the second processing (step S408). On the other hand, when it is determined that such data does not exist in the table 506, the processing proceeds to the first processing (step S406). In step S803, the hash processing unit 334 stores the partial hash value calculated in step S801 in the table 506. More specifically, in step S803, the hash processing unit 334 stores the partial hash value in association with the document ID and the document hash value.

In the second exemplary embodiment, the hash processing unit 334 switches between the first and the second processing by using only the partial hash value. In a modified example where the first exemplary embodiments are combined, the hash processing unit 334 switches between the first and the second processing. More specifically, the hash processing unit 334 performs the second processing only when the user ID determination in step S405 illustrated in FIG. 4, the data size determination in step S407 illustrated in FIG. 4, and the partial data hash value determination in step S802 illustrated in FIG. 8 are all satisfied (YES in all of steps S405, S407, and S802). The hash processing unit 334 performs the first processing when any one of the user ID determination in step S405 illustrated in FIG. 4, the data size determination in step S407 illustrated in FIG. 4, or the partial data hash value determination in step S802 illustrated in FIG. 8 is not satisfied (NO in any one of steps S405, S407, and S802). The determination unit 331 may perform the user ID determination in step S405 illustrated in FIG. 4, the data size determination in step S407 illustrated in FIG. 4, and the partial data hash value determination in step S802 illustrated in FIG. 8 in any order. The table stored in the image forming apparatus 101 includes the document ID, the partial hash value, the document hash value, the user ID, and the data size.

A third exemplary embodiment will be described below. As the third exemplary embodiment, the following describes an example where the first processing and the second processing are switched according to the location of the server 105.

Figure 10:
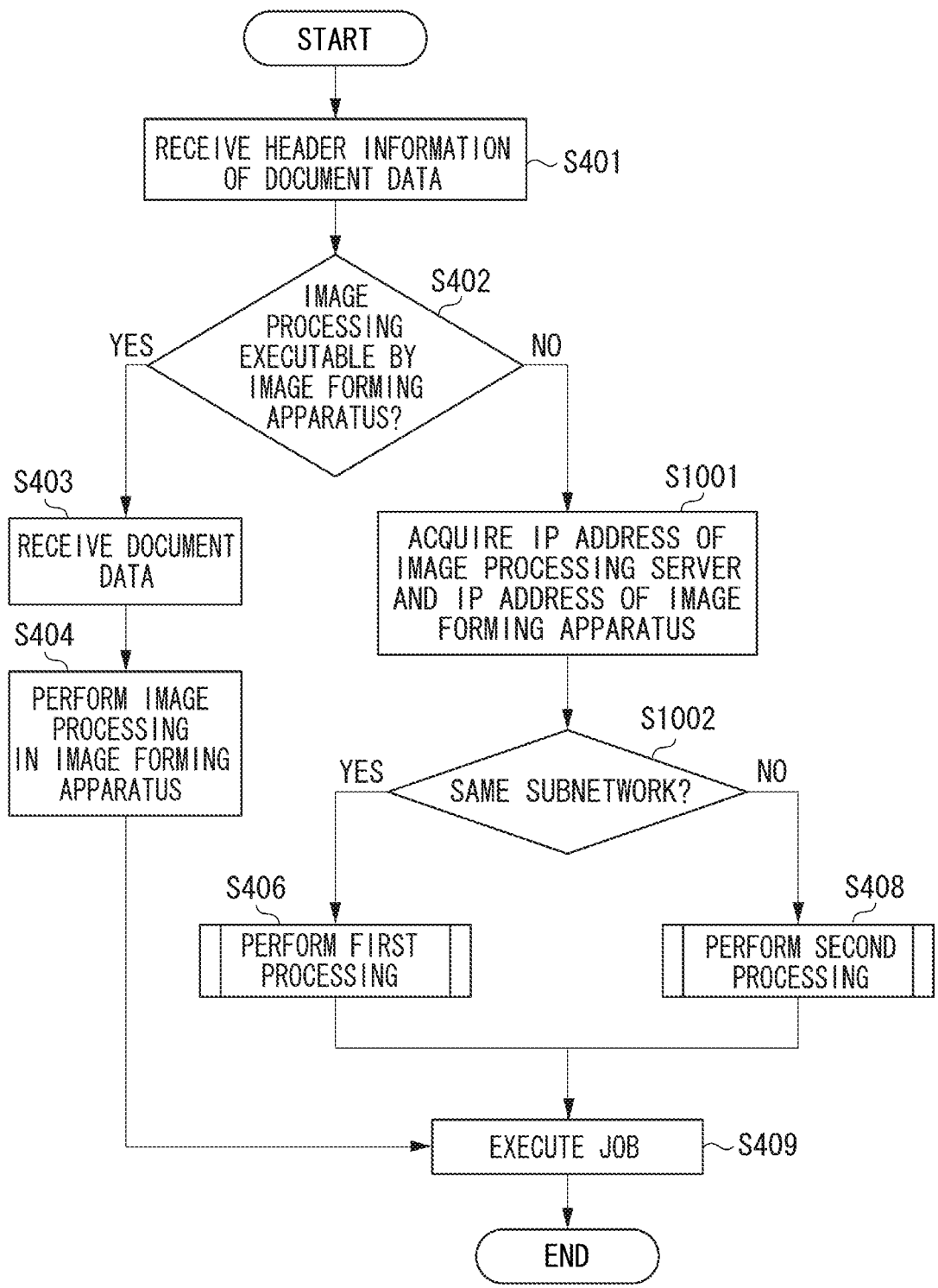
FIG. 10 is a flowchart illustrating processing by an image forming apparatus according to a third exemplary embodiment.

FIG. 10 is a flowchart illustrating processing performed by the image forming apparatus 101 according to the present exemplary embodiment. This flowchart is implemented when the CPU 311 of the image forming apparatus 101 executes a program stored in the HDD 313. Steps other than steps S1001 and S1002 are similar to those in the first exemplary embodiment, and redundant descriptions thereof will be omitted.

In step S1001, the control unit 335 searches for and acquire an IP address of the server 105 and an IP address of the image forming apparatus 101. In step S1002, the determination unit 331 compares the two acquired IP addresses. When the two IP addresses indicate the same subnetwork (YES in step S1002), the possibility that communication becomes a bottleneck is low, and the processing proceeds to the first processing in step S406. On the other hand, when the two IP addresses indicate different subnetworks (NO in step S1002), the possibility that communication becomes a bottleneck is high, and the processing proceeds to the second processing in step S408.

In the present exemplary embodiment, the determination unit 331 compares the subnetworks of the server 105 and the image forming apparatus 101 to determine whether the two apparatuses are in a common network environment and then switch between the first and the second processing. However, any methods for determining the location of the server 105 are applicable. For example, the image forming apparatus 101 may measure the Round-Tripdelay Time (RTT) in relation to the server 105 and provide a fixed threshold value to switch between the first and the second processing.

A fourth exemplary embodiment will be described below. As the fourth exemplary embodiment, the following describes an example where the first processing and the second processing are switched according to the type of a job to be executed by the image forming apparatus 101.

Figure 11:
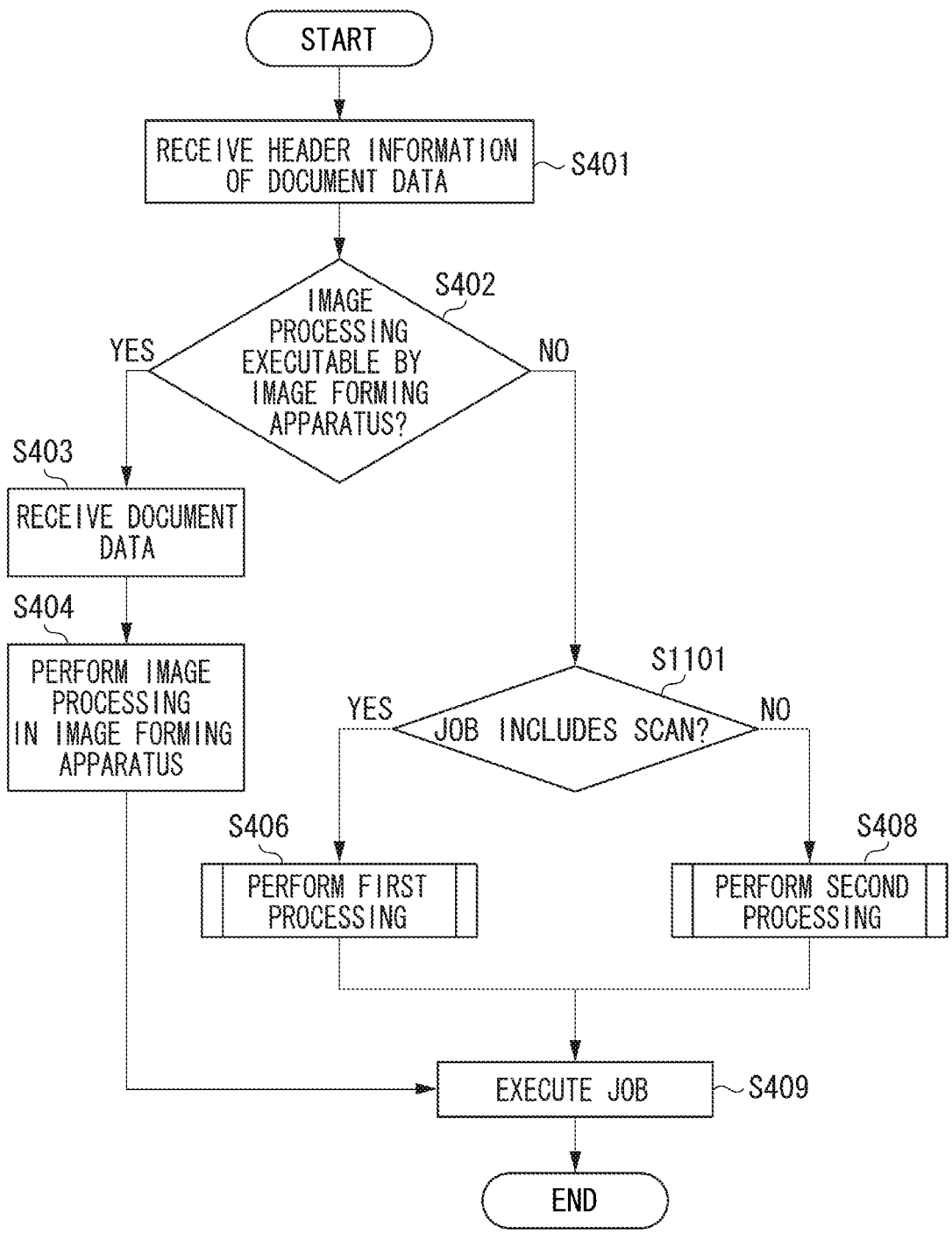
FIG. 11 is a flowchart illustrating processing by an image forming apparatus according to a fourth exemplary embodiment.

FIG. 11 is a flowchart illustrating processing performed by the image forming apparatus 101 according to the present exemplary embodiment. This flowchart is implemented when the CPU 311 of the image forming apparatus 101 executes a program stored in the HDD 313. Steps other than step S1101 are similar to those in the first exemplary embodiment, and redundant descriptions thereof will be omitted.

In step S1101, the determination unit 331 determines whether the job includes scan processing. A job including scan processing refers to, for example, a copy job in which the scanner 302 of the image forming apparatus 101 is used. A job not including scan processing refers to a job in which the scanner 302 of the image forming apparatus 101 is not used, such as a job to be executed on the document data stored in the HDD 313, or a job input from a network. When the job includes scan processing (YES in step S1101), the input document data should not match each other on the binary level, and the processing proceeds to the first processing (step S406). On the other hand, when the job does not include scan processing (NO in step S1101), document data matching the document data, which has been input to the server 105, may possibly exist, and the processing proceeds to the second processing (step S408).

A fifth exemplary embodiment will be described below. As the fifth exemplary embodiment, the following describes an example where the first processing and the second processing are switched according to a storage area used by the image forming apparatus 101 to store document data. Steps other than steps S1201 and S1202 are similar to those in the first exemplary embodiment, and redundant descriptions thereof will be omitted.

Figure 12:
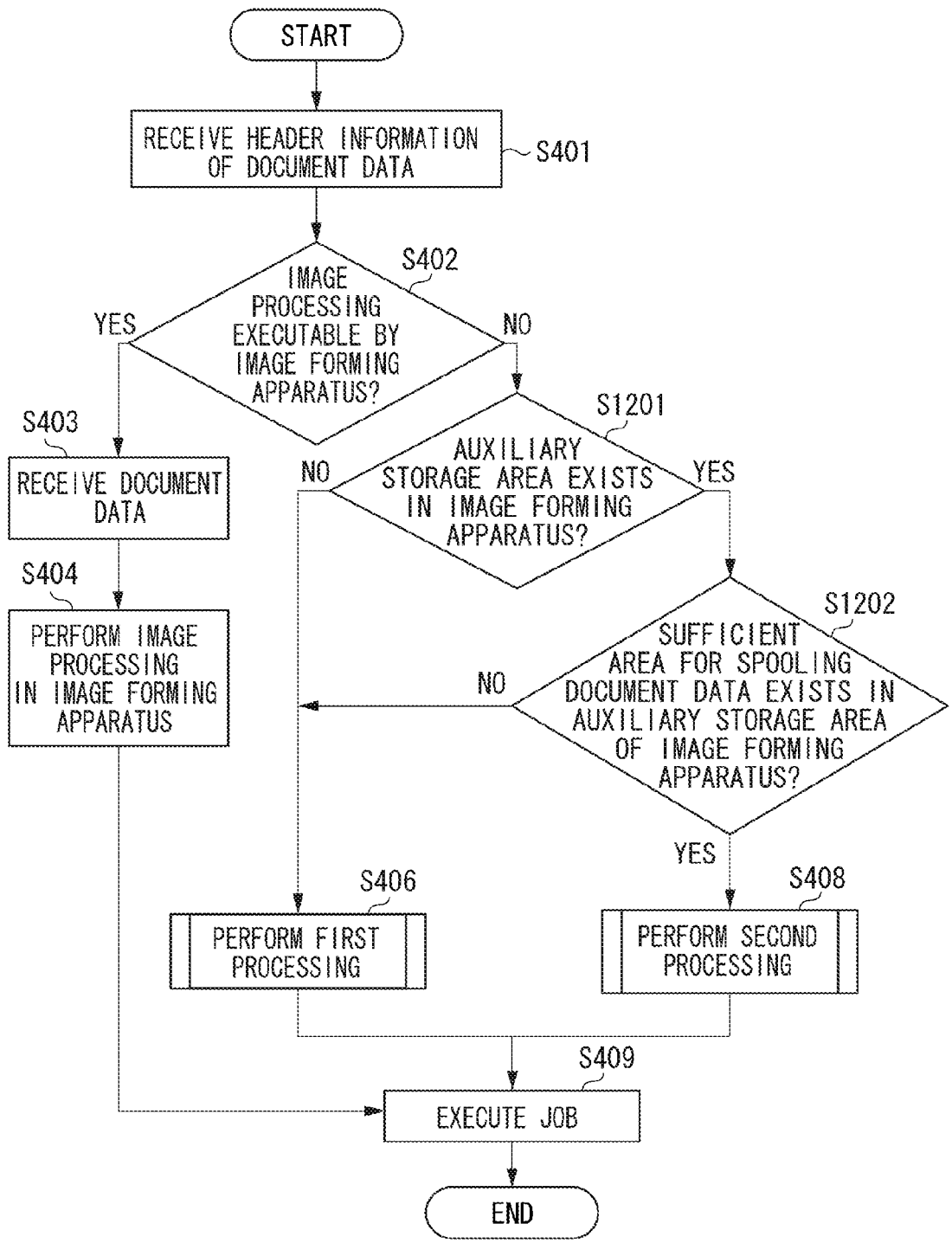
FIG. 12 is a flowchart illustrating processing by an image forming apparatus according to a fifth exemplary embodiment.

FIG. 12 is a flowchart illustrating processing performed by the image forming apparatus 101 according to the present exemplary embodiment. This flowchart is implemented when the CPU 311 of the image forming apparatus 101 executes a program stored in the HDD 313.

In step S1201, the determination unit 331 determines whether an auxiliary storage area exists in the image forming apparatus 101. The image forming apparatus 101 may be configured not to include the HDD 313. In this example, the auxiliary storage area refers to an area for temporarily storing document data. And thus, the auxiliary storage area is not limited to the built-in HDD 313 when the determination is made. Therefore, any methods for storing document data, such as a USB attached to the expansion I/F 318, an external HDD, and a secure digital (SD) card, are applicable as long as document data can be stored. When no auxiliary storage area exists (NO in step S1201), the hash value calculation cannot be performed by spooling the document data, and the processing proceeds to the first processing (step S406). On the other hand, when a spool area exists (YES in step S1201), the processing proceeds to step S1202. In step S1202, the determination unit 331 determines whether a sufficient area for spooling the document data exists in the spool area of the image forming apparatus 101. The sufficient area refers to an area required only to temporarily store common document data. A threshold value, for example 1 GB, may be set on the system. In the case of an apparatus connected to the expansion I/F 318 or an unwritable auxiliary storage medium, the document data cannot be spooled and therefore the determination unit 331 determines that a sufficient area does not exist. When a sufficient area does not exist (NO in step S1202), the hash value calculation cannot be performed on the document data, and the processing proceeds to the first processing (step S406). On the other hand, when a sufficient area exists (YES in step S1202), the hash value calculation can be performed by spooling the document data, then the processing proceeds to the second processing (step S408).

According to the exemplary embodiments described above, an image forming apparatus can be implemented by a computer program which operates on the apparatus. Generally, a computer program is stored in a computer-readable storage medium such as a compact disc read only memory (CD-ROM). The computer program becomes executable when the storage medium is set in a corresponding drive in the computer, and copy or installation processing is performed on the system. Therefore, such a computer-readable storage medium is also included in the scope of the present invention. Further, the processing described in the flowcharts in FIGS. 4, 6, 7, 8, 10, 11, and 12 may be implemented when the CPU 311 of the image forming apparatus 101 executes programs stored in the HDD 313. The processing described in the flowchart in FIG. 9 may be implemented when the CPU 211 of the server 105 executes a program stored in the HDD 213.

As described above, an image forming apparatus determines whether to perform hash comparison processing according to a capacity of a document data storage area in the image forming apparatus, similarity of document data, a location of a server, characteristics of a job, etc., so that performance degradation can be reduced which occurs when requesting a server to perform processing.

According to the exemplary embodiments described above, it is possible to reduce performance degradation of an image forming apparatus, which occurs when the image forming apparatus requests a server to perform processing.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-118106, filed Jun. 6, 2014, which is hereby incorporated by reference herein in its entirety.

What is claimed is:

1. An image forming apparatus that communicates with a server for processing document data, the image forming apparatus comprising:

a receiving unit configured to receive document data;

an acquisition unit configured to acquire a hash value of data transmitted to the server; and a control unit configured to perform control for switching between a first processing and a second processing, wherein, if the control unit determines that a hash value for the document data need not be generated, the control unit executes the first processing, wherein, in the first processing, a transmission of the document data to the server is started without waiting for a completion of a spooling of the received document data, and wherein, in the second processing, a determination is made using the hash value of the document data and the acquired hash value, after the spooling of the document data is completed, and, based on a result of the determination, the document data is transmitted to the server, and wherein, execution of the first processing transmits the document data to the server quicker than execution of the second processing.

2. The image forming apparatus according to claim 1, wherein the control unit switches, based on a data size of the document data, between the first processing and the second processing.

3. The image forming apparatus according to claim 1, further comprising:

a generating unit configured to generate a hash value of partial data of the document received by the receiving unit, wherein the acquisition unit is configured to acquired a hash value of the partial data transmitted to the server, and the control unit is configured to switch, based on a comparison between the hash value generated by the generating unit and the hash value acquired by the acquisition unit, between the first processing and the second processing wherein if the hash value generated by the generating unit corresponds to the hash value acquired by the acquisition unit, the control unit executes the first processing and if the hash value generated by the generating unit does not correspond to the hash value acquired by the acquisition unit, the control unit executes the second processing.

4. The image forming apparatus according to claim 1, further comprising:

a determination unit configured to determine whether the document data received by the receiving unit is able to be processed by the image forming apparatus; and a processing unit configured to process the document data when the determination unit determines that the document data is able to be processed by the image forming apparatus, wherein, when the determination unit determines that the document data is not able to be processed by the image forming apparatus, the image forming apparatus executes the control performed by the control unit.

5. The image forming apparatus according to claim 1, wherein the second processing compares the hash value of the document data with the acquired hash value, and, when the hash values match, transmits information for identifying the document data to the server and when the hash values do not match, transmits the document data to the server.

6. The image forming apparatus according to claim 1, wherein the control unit switches, based on a data size and a user ID included in header information of the document data, between the first processing and the second processing.

7. A method, executed by one or more processing units, for controlling an image forming apparatus that communicates with a server for processing document data, the executed method comprising:
   receiving document data;
   acquiring a hash value of data transmitted to the server; and
   switching between a first processing and a second processing, wherein if it is determined that a hash value for the document data need not be generated, the first processing is executed,
   wherein, in the first processing, a transmission of the document data to the server is started without waiting for a completion of a spooling of the received document data, and
   wherein, in the second processing, a determination is made using a hash value of the document data and the acquired hash value, after the spooling of the received document data is completed, and, based on the determination result, the document data is transmitted to the server and
   wherein execution of the first processing transmits the document data to the server quicker than execution of the second processing.

8. The method for controlling an image forming apparatus according to claim 7, wherein switching between the first processing and the second processing is executed based on a data size of the document data.

9. The method for controlling an image forming apparatus according to claim 7, further comprising
   generating a hash value of partial data of the received document data transmitted to the server, and
   switching, based on a comparison between the generated hash value and the acquired hash value, between the first processing and the second processing is executed
   wherein, if the generated hash value corresponds to the acquired hash value, the first processing is executed and, if the generated hash value does not correspond to the acquired hash value, the second processing is executed.

10. The method for controlling an image forming apparatus according to claim 7, the method further comprises:
   determining whether the received document data is able to be processed by the image forming apparatus; and
   processing, the document data when it is determined that the document data is able to be processed by the image forming apparatus; and
   switching between the first processing and the second processing when it is determined that the document data is not able to be processed by the image forming apparatus.

11. The method for controlling an image forming apparatus according to claim 7, wherein the second processing compares the hash value of the document data with the acquired hash value, and, when the hash values match, transmits information for identifying the document data to the server or and when the hash values do not match, transmits the document data to the server.

12. The method for controlling an image forming apparatus according to claim 7, switching between the first processing and the second processing is executed based on a data size and a user ID included in header information of the document data.

13. A non-transitory computer-readable storage medium storing computer executable instructions for causing a computer to execute a method for controlling an image forming apparatus that communicates with a server for processing document data, the method comprising:
   receiving document data;
   acquiring a hash value of data transmitted to the server; and
   switching between a first processing and a second processing, wherein if it is determined that a hash value for the document data need not be generated, the first processing is executed,
   wherein, in the first processing, a transmission of the document data to the server is started without waiting for a completion of a spooling of the received document data, and
   wherein, in the second processing, a determination is made using a hash value of the document data and the acquired hash value, after the spooling of the received document data is completed, and, based on the determination result, the document data is transmitted to the server and
   wherein execution of the first processing transmits the document data to the server quicker than execution of the second processing.

14. An image forming apparatus that communicates with a server for processing data, the image forming apparatus comprising:
   a receiving unit configured to receive a job;
   an acquisition unit configured to acquire a hash value of data transmitted to the server; and
   a control unit configured to perform, in a case where a job type of the received job is a first type and it is determined that a hash value for the job need not be generated, a first processing, and perform, in a case where the job type of the received job is a second type different from the first type, a second processing,
   wherein, in the first processing, transmission of document data for executing the received job to the server is started without waiting for completion of a spooling of the document data, and
   wherein, in the second processing, a determination is made using the hash value of the document data and the acquired hash value after the spooling of the document data is completed and, based on a result of the determination, the document data is transmitted to the server,
   wherein execution of the first processing transmits the document data to the server quicker than execution of the second processing.

15. The image forming apparatus according to claim 14, wherein
   a job of the first type includes a scan job.

* * * * *